United States Patent [19]
Shatila et al.

[11] 3,968,260
[45] July 6, 1976

[54] PRODUCT AND PROCESS FOR PRODUCING DEHYDRATED GRANULAR POTATO PRODUCT HAVING HIGH COLD WATER ADSORPTION

[75] Inventors: Mounir A. Shatila; Robert M. Terrell, both of Blackfoot, Idaho

[73] Assignee: American Potato Company, Vacaville, Calif.

[22] Filed: Feb. 21, 1975

[21] Appl. No.: 551,837

Related U.S. Application Data

[63] Continuation of Ser. No. 344,052, March 22, 1973, abandoned.

[52] U.S. Cl. .............................. 426/96; 426/307; 426/637; 426/472; 426/473
[51] Int. Cl.² .......................................... A23B 4/04
[58] Field of Search ........... 426/637, 465, 467, 469, 426/471–473, 302, 307, 96, 99, 478, 479, 481, 482, 579

[56] References Cited
UNITED STATES PATENTS
3,009,817  11/1961  Hendel et al. ..................... 426/473

*Primary Examiner*—Norman Yudkoff
*Assistant Examiner*—Martin G. Mullen
*Attorney, Agent, or Firm*—Kenyon & Kenyon Reilly Carr & Chapin

[57] ABSTRACT

A dehydrated potato product is produced in a singlepass, non-addback process by preparing and cooking potatoes, mixing the cooked potatoes with a starch complexing emulsifier in the range of 0.3 to 2.0% by weight of solids to coat the surface of the potato cells, and mixing the resulting mash while directly subjecting the mash to a high velocity heated air stream to dry the mash to a point at which partially dried particles are airlifted and removed from the mixer-dryer. The partially dried cells are then dried to completion by conventional means. The starch complexing emulsifier reduces the adhesive characteristics of the mash, allowing separation of intact cells without damage after reducing the mash moisture to the range of about 30 to 50%. The dehydrated cooked potato product consists of intact potato cells in granular form substantially passing through a standard 60 mesh screen with high cold water absorption characteristics and rehydratable in hot water into mealy mashed potatoes.

29 Claims, 3 Drawing Figures

PRODUCT AND PROCESS FOR PRODUCING DEHYDRATED GRANULAR POTATO PRODUCT HAVING HIGH COLD WATER ADSORPTION

This application is a continuation of Ser. No. 344,052 filed 3/22/73 and now abandoned.

BACKGROUND OF THE INVENTION

1. Field of the Invention

The invention relates to the production of dehydrated intact cooked potato cells, i.e. potato granules. Further, the invention relates to a single-pass, continuous process not requiring the addback of the final product to the starting materials as required in prior art potato granule processes.

2. Description of the Prior Art

There are numerous disclosures in the prior art for processes to produce by a direct process dehydrated potato pieces capable of reconstitution to a mashed potato.

Great Britain Pat. No. 542,125 discloses a process wherein mashed potatoes are dried at a temperature of 50°–60°C. for two hours to reach a moisture content of 40 to 60%. The partially dried mash is then compressed and conditioned for 6 to 24 hours, after which it is divided by rubbing through a sieve, and the divided pieces are then dried to completion.

U.S. Pat. No. 2,750,295 discloses a process in which mashed potatoes are mixed with ethyl alcohol and 60% of the moisture is removed by distillation. Additional alcohol is mixed with the partially dried potatoes to remove an additional 35% of the water, and after filtration, the unicellular granules are dried conventionally. This process is too costly and leaves an undesirable residual flavor.

Also there are many prior art processes based on the "freeze-squeeze" approach in which mashed potatoes are frozen; thawed; and dewatered to produce a friable damp powder which can be dried conventionally. However, such processes are not satisfactory because of economic reasons coupled with unacceptably large losses of solids and nutrients and resulting sandy texture.

Great Britain Pat. No. 740,711 to Templeton discloses a non-addback process for making dehydrated potato powder except that addback is initially used during start-up. Templeton adds cooked potatoes having up to 60% moisture to the inlet end of a three trough mixer-evaporator. Each trough is surrounded by a steam jacket to keep the product at about 50°C. maximum. Countercurrent air is blown over the product to evaporate the water as the product progresses through the mixer. At the outlet end a moist powder is discharged having below 30% moisture which is then final dried. The process is either a batch process or can be run continuously by adjusting the rate of input with the rate of output so that a certain level is maintained in the mixer. There is no disclosure of the use of monoglycerides nor is there a disclosure that the powder is granulated without excessive damage during mixing and entrained by the air flow.

U.S. Pat. No. 3,133,797 to Pierson discloses a non-addback process for dehydrating potatoes in which the cooked potatoes are mechanically forced by a roller through screen openings separating the mash into aggregates and are then blown off of the screen by an air blast. The particles fall through a dehydrator countercurrent to a warm air flow and are then finish dried. The end product is a mixture of granules and powder. A similar process is disclosed in U.S. Pat. No. 3,517,716 to Carlsen which includes additional baffle means and countercurrent air flow means to retard the free fall of the comminuted particles through the dryer and permit adequate drying thereof. Neither of these processes disclose the use of monoglycerides nor the granulation of the moist mash by passing it through the dryer and entraining the granulated particles in the air flow to remove them from the system.

U.S. Pat. No. 3,009,817 to Hendel discloses a non-addback process for making dehydrated potato granules. Raw potatoes are washed, peeled, trimmed, cut, and dipped in sodium bisulphite solution and cooked. The cooked potatoes are mashed, blended with optional additives which include edible dispersing agents such as monoglyceryl esters of long chain fatty acids to increase the ability to absorb water and to reduce stickiness, and then conditioned by cooling for several hours either at room temperature or for shorter periods at down to sub-freezing temperatures. The conditioned, cooked potatoes are then granulated by subdividing the mash into single cells without rupturing the cells by gently mixing in a granulator while subjecting the mix to a hot air stream to reduce moisture. Thereafter, the temperature and velocity of the air is increased and the granulated particles are entrained by the air stream and carried into a collector and then finally dried. The process is long, requiring as a minimum 2 to 3 hours from the time the conditioning step begins. Hendel teaches the elimination of or shortening the duration of his conditioning step but only in a process where portions of the final product are added back to the starting materials and even then a cooling step is required. See also, U.S. Pat. No. 3,009,816 to Hendel for a generally similar disclosure but teaching the addition of a 1 – 4 hour soaking step prior to cooking in order to increase the water absorption characteristics of the dehydrated granules.

Applicants have found, through the proper use of monoglycerides to coat the individual intact cooked potato cells, a unique process by which Hendel's conditioning step can be eliminated without the need to use either a cooling step or the step of adding back final product to the starting materials and applicants achieve improved water absorption characteristics over prior art granules without a soaking step. Applicants' process is quick and effective and a distinct improvement over Hendel's teachings.

Cooked potato cells are extremely fragile and if ruptured during processing, the end products are too rubbery or sticky to be utilized in making mealy mashed potatoes. This accounts for the failure of prior art single-pass potato granules processes to make a product of acceptable quality. In contrast, the product of this invention has a more natural, freshly cooked potato flavor. The product is not subjected to repeated handling and heating and does not require the protective additives necessary in some prior art processes. The texture is mealy when reconstituted in contrast to stickiness or a sandy quality characteristic of prior art products. In addition, the product of the invention has improved cold water absorption qualities and is especially desirable in formulation of fabricated potato snack products such as those described in U.S. Pat. Nos. 3,539,356 and 3,576,647.

SUMMARY OF THE INVENTION

The invention includes a process for making a dehydrated potato product having unique characteristics in which raw potatoes are first prepared for cooking in the usual manner by washing, peeling, trimming and cutting. Optionally the cut potatoes are dipped in a sodium bisulphite solution to prevent discoloration and are then cooked conventionally. The cooked potatoes are mixed with a starch complexing emulsifier in order to separate the cooked potato cells and uniformly coat the separated cells with a film of the emulsifier. This separating and coating action reduces the cohesiveness of the freshly mashed potatoes and lubricates the surface of the cells to prevent rupture during subsequent processing. The potato-emulsifier mixture is then granulated in a mixer-dryer by mixing the mixture to expose new moist surfaces for drying without rupture of the cells while drying the surfaces by injecting high velocity hot air directly onto the surfaces. When the moisture content of the mixture is approximately 25–30% by weight, intact potato cells and small agglomerates thereof are automatically separated from the mixture and airlifted out of the mixer-dryer where they are separated from the air stream and then conventionally dried to about 8% moisture content. These granules are of a particle size that will substantially pass a 40 mesh screen, have high cold water absorption characteristics and produce a mealy mashed potato when rehydrated in water.

It is an object of this invention to produce dehydrated potato granules without the use of addback and without the necessity for conditioning the starting materials. It is an object of this invention to use whole potatoes without the necessity of precooking and cooling.

It is an object of this invention to use a process which can produce granules suitable for final drying within 45 minutes after the mashed potatoes are ready for granulation and drying.

It is an object of this invention to provide a product that is low in additives and has unusually high cold water absorption characteristics.

Other objects will be clear from the description and claims that follow.

DETAILED DESCRIPTION OF THE PREFERRED EMBODIMENTS

The production of potato granules requires preparing and cooking potatoes, separating intact potato cells without rupturing them and then drying the separated cells. Ruptured cells liberate free starch which makes the resulting dried product unacceptable in that when it is rehydrated with water to form mashed potatoes, the potatoes are sticky or gummy.

In this description, the term "agglomerate" is applied to a group of intact potato cells which have been separated but which adhere in loose random fashion. In contrast, the term "aggregate" is applied to particles of potato comprising intact cells which have not been previously separated, such as would be formed by forcing cooked potato through a screen aperture followed by drying. The particles would be dense and would rehydrate poorly.

The first stage of processing is to prepare the potatoes. Raw potatoes are lye peeled, washed and trimmed as usual. The potatoes are then dipped into a sodium bisulfite solution (½% as $SO_2$) to neutralize any residual lye prior to cooking. This results in a $SO_2$ content in the finished product which is far below the amount normally found in dehydrated instant mashed potato products.

The process of this invention is a low additive process. It is not necessary to add large amounts of additives, such as $SO_2$-containing salts, chelating agents, antioxidants and the like, to protect the product during the process. Normally, commercial potato granules contain 200–500 ppm $SO_2$ in addition to antioxidants and other preservatives which are necessary to prevent oxidation and discoloration during repeated and lengthy heating, standing, and drying periods. All of these additives are eliminated in the present process. Indeed but for the trace of $SO_2$ and the starch complexing emulsifier, described below, there are no other additives necessary to the process. Although the preferred embodiment uses completely prepared potatoes, we have operated the process successfully, with minor alterations, on unpeeled potatoes. Large peel pieces are quickly entrained in the mixer-dryer described below and can be separated subsequently from the intact cells by screening.

The next stage of processing is cooking the prepared potatoes. It will be obvious to one skilled in the art that any method of cooking potatoes to completion can be employed in the inventive process. Although we prefer to cook with atmospheric steam, hot oil or hot water cooking are likewise satisfactory.

The next stage of processing is separating the cooked potato cells and uniformly coating the separated cell surfaces with a film of starch complexing emulsifier. This step is preferably accomplished by partially mashing the cooked potatoes as by ricing and immediately mixing with a starch complexing emulsifier, such as glyceryl monostearate at a temperature above its melting point. During the mixing, which is necessary to accomplish complete cell separation, the emulsifier is uniformly distributed and the surfaces of the separated cells are uniformly coated with a thin film of the melted emulsifier. This coating accomplishes two functions. As is known in the prior art, starch complexing emulsifiers complex with the soluble amylose starch fraction that is at least partially responsible for the cohesiveness of freshly mashed potatoes. Such emulsifiers also appear to lubricate the potato cell surfaces so that they are not ruptured during subsequent moderate mixing and drying.

As one example we have successfully mixed the potatoes at a temperature of about 190°F. with Myverol 18–06 (a distilled glyceryl monostearate sold by Eastman Chemical Products, Inc.) at a concentration of 1.0% by weight based upon potato solids to coat the intact potato cells with a film of monoglyceride.

The coating action can also be accomplished by adding the emulsifier in dispersed form, but this technique introduces into the system appreciable additional water which must be removed in the drying step. However, the advantage of this alternative is that the coating action takes place below the melting point of the emulsifier. An example of a suitable dispersed emulsifier is one made by mixing 1.1 parts by weight of glyceryl monostearate with 25 parts of water at 160°F. to form a stable creamy colloid.

Although we prefer to use monoglycerides such as glyceryl monostearate as the starch complexing emulsifier, test runs were successfully conducted using other starch complexing emulsifiers. Sodium stearyl fumarate, calcium stearoyl -2-lactylate, sodium stearoyl-2-lactylate, and propylene glycol monoester were all effective in the same concentration as used for the monoglycerides — 0.3–2.0%. Commercial propylene glycol monoester contains about 11% monoglycerides.

The concentration of the starch complexing emulsifier was found to be very important. When the process was conducted using the emulsifier at a concentration below 0.3% by weight based on total solid matter, the mash became progressively more rubbery during subsequent mixing and eventually formed an unmanageable ball with no trace of granulation. At the other extreme, there was no advantage in adding more than 2% on a solids basis. It appears that adequate "lubrication" and complexing of the soluble amylose are accomplished in the range of 0.3 – 2%.

The temperature of the mashed potato-emulsifier mix was likewise found to be very important. When the potatoes are allowed to cool before the addition of the emulsifier resulting in a mix temperature below the melting point of the emulsifier, the separated intact potato cells are not adequately coated or lubricated and the soluble amylose is not complexed. As a result, the mix contains unmelted emulsifier particles and does not granulate properly, and a product comparable in particle size to potato granules cannot be produced. Glyceryl monostearate, the monoglyceride used in the preferred embodiment, has a melting point of 65°–70°C. (149.0° – 158.0°F.) When the temperature of the mix is maintained above this value, uniform distribution of the monoglyceride can be accomplished without damage. We prefer to mix at a temperature of at least 160°F. to assure complete coating of the potato cells. Monoglycerides of other comparable fatty acids, such as lauric and palmitic have lower melting points and could undoubtedly be distributed at temperatures below 150°F. but above their melting points. It is essential that the monoglycerides, or other starch complexing emulsifier employed, be uniformly distributed. The mixing steps outlined above accomplish this, although any other non-damaging means of distribution would be equally satisfactory.

In an alternative embodiment, the cooked potatoes are slurried and defective portions, such as peel and eye fragments, are removed by screening to produce a defect-free slurry of intact potato cells consisting of about 18% potato solids. The slurry is then intimately mixed hot with monoglycerides and may be added to the mixer-dryer (described below) as the sole source of potato solids. The dry end product is substantially defect-free. Of course, the extra water added to form the slurry has to be additionally removed during drying of the product.

The next stage of processing is granulating the cooked potatoes by mixing and drying them in the mixer-dryer and then airlifting the granulated particles out of the system for final treatment.

Figure 1:
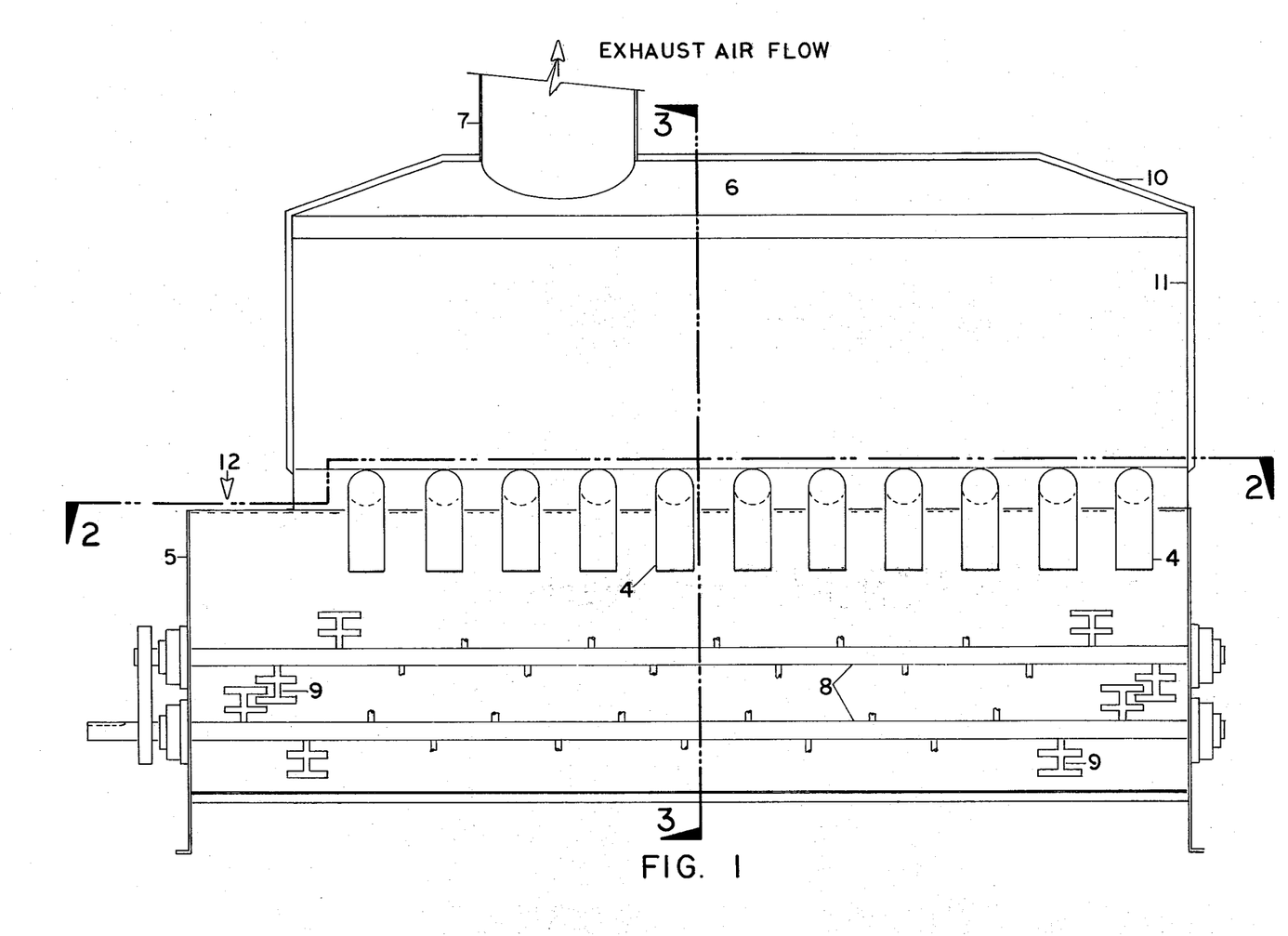
FIG. 1 is a cross sectional view of the mixer-dryer taken along the lines 1—1 of FIG. 3.
Figure 2:
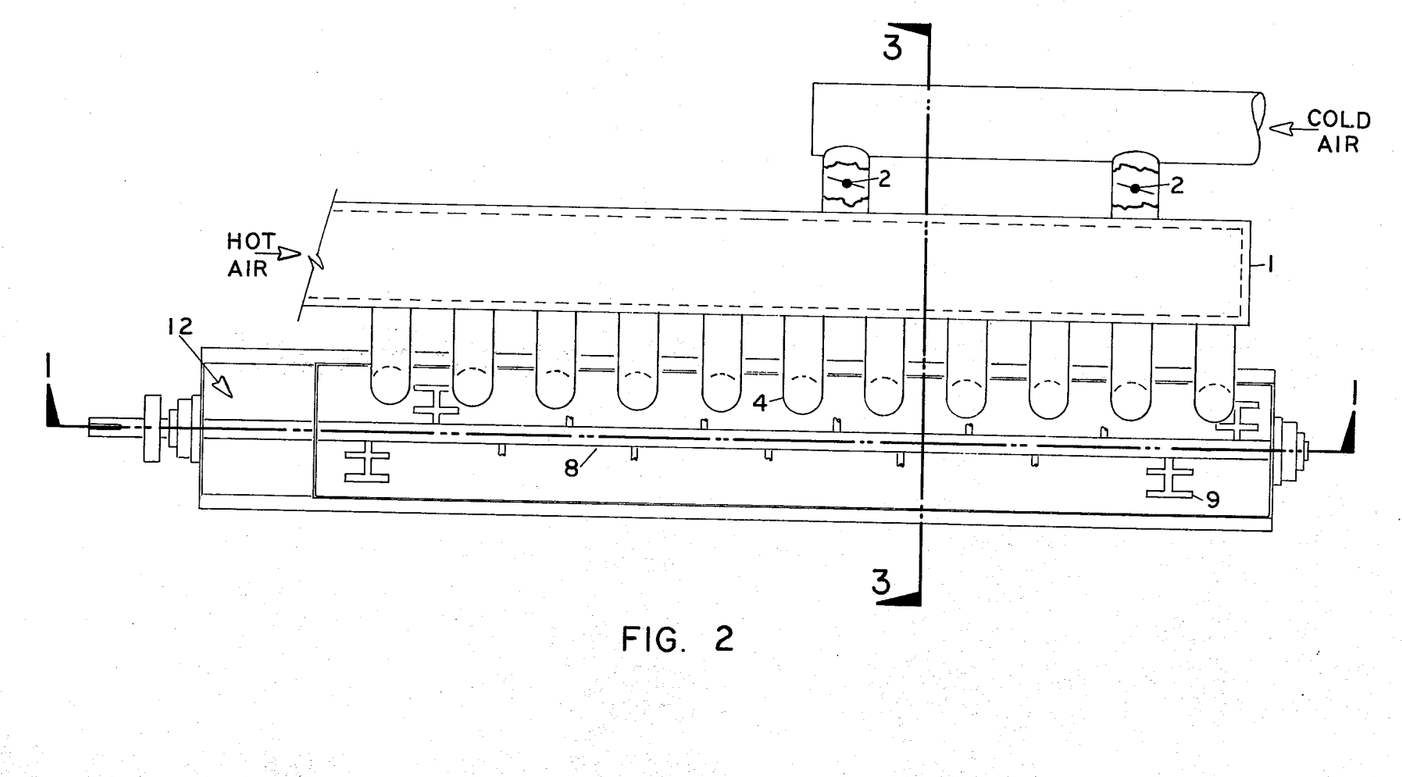
FIG. 2 is a cross sectional plan view of the mixer-dryer showing air distribution means and mixing paddle structure taken along the line 2—2 of FIG. 1.
Figure 3:
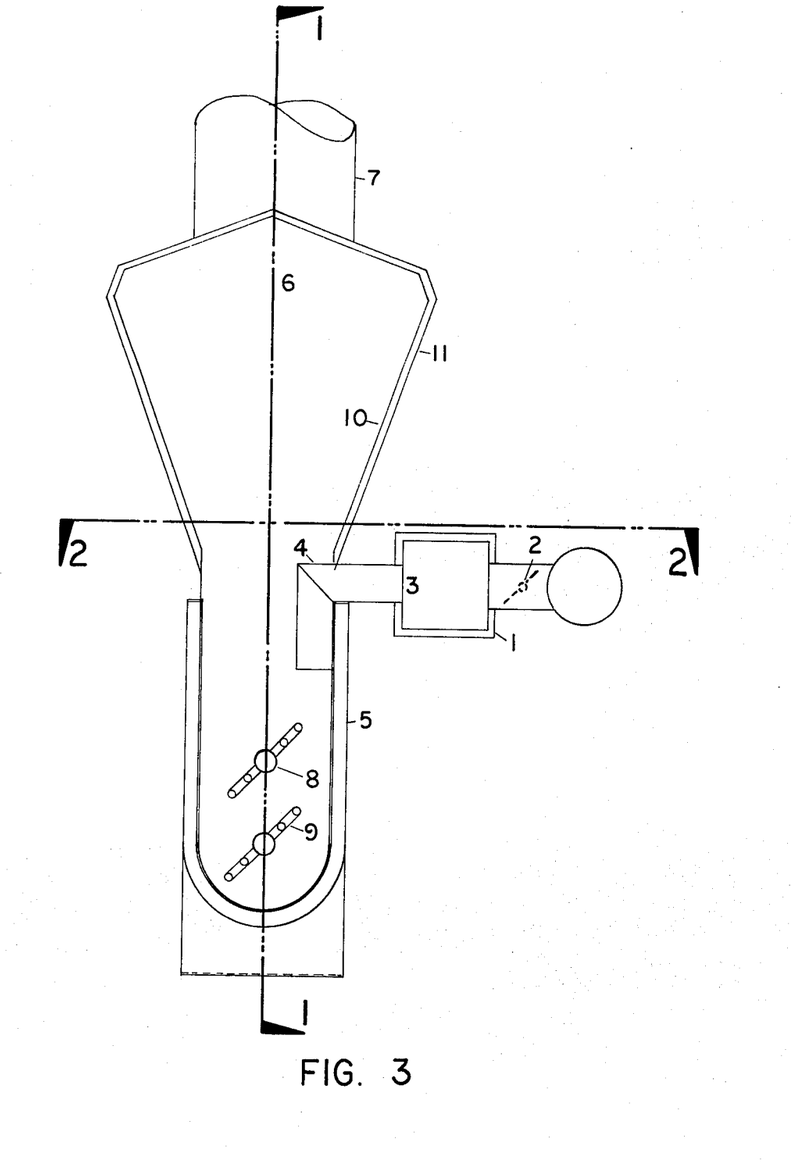
FIG. 3 is a cross section end view of the mixer-dryer taken along the line 3—3 of FIG. 1 and showing the expansion hood and mixer paddles.

One apparatus for performing these steps is shown in FIGS. 1, 2 and 3 and will be first described. It is understood that additional apparatus may be employed to perform these same steps.

Referring to FIG. 1, the inlet end of the mixer-dryer is shown generally at 12. Inside the mixer-dryer are located two parallel shafts 8 which rotate (drive means not shown) in the same direction and carry intermeshing paddles 9 with a cross-of-Lorraine comfiguration. As shown in FIG. 2, hot air enters the air distribution header 1 and is controllably mixed with cold air through dampers 2 and is then led through outlets 3 and tubes 4 where it is sent at high velocity directly into the troughs 5 of the mixer-dryer. As best shown in FIG. 3 a hood 10 with 20° diverging sides 11 sits atop the mixer-dryer. The angled sides 11 function to prevent product buildup thereon and also function as a diffuser to reduce air velocity as air progresses toward the top 6 of the hood and out the exhaust duct 7.

In the operation of the mixer-dryer, it has been found that if high velocity heated air is directed onto the mashed potato — emulsifier mixture, the moisture content which was initially about 80% can be lowered without the rupture of cells or the formation of a hard, horny crust known as case hardening. The mixing constantly exposes new drying surfaces to the heated air.

The mashed potato-emulsifier mixture is continuously fed into the mixer-dryer at the inlet end 12 at the rate of about 24 pounds per minute. At this location the mixture resembles a dough and has a moisture content initially at about 80%. As the mix progresses (rightward in FIG. 1) in the mixer-dryer, the dough begins to separate into small particles when the moisture content has been reduced to about 40% under the drying action of the high velocity hot air. Farther rightward in the mixer-dryer where the moisture content is reduced to about 25–30%, the mix begins to granulate to particles which are then entrained in the air flow. The air velocity is adjusted so that single intact cells or small agglomerates of about 40 mesh consisting of several intact cells are air lifted and carried out of the system along with smaller quantities of larger fractions, such as natural fibers and small pieces of residual peel. This granulation is sudden and unexpected and does not start until the moisture level is near 25–30%. Most of the entrained agglomerates larger than about 40 mesh remain in the system by falling back into the trough 5 and are further granulated and dried. This separation of larger particles is accomplished by expanding the area of hood 10 above the mixer-dryer to reduce the air velocity rapidly. (see FIG. 3) Single cells and small agglomerates remain entrained and are removed in the exhaust air through exhaust duct 7 for subsequent collection and final drying.

The process is made continuous by adding potato solids in the form of mashed potato-emulsifier mixture at the inlet end 12 of the mixer roughly equivalent in weight to the potato solids which are separated from the system.

The optimum speed of the mixing means would undoubtedly be different for each different piece of mixing equipment. A rotational speed must be chosen which will be slow enough not to throw the potato mix out of contact with the mixing means and not to rupture the tender potato cells by impact or abrasion and yet will be fast enough to expose continuously enough new moist surfaces to allow rapid drying. We prefer the mixer shown in FIGS. 1–3 which is used in commercial potato granule operations to blend cooked potatoes and addback uniformly to a damp powder. On this mixing equipment a rotational speed of 100–120 rpm is optimum and was found to be efficient and non-damaging. 60 rpm does not expose sufficient new drying surfaces and 160 rpm throws the product excessively.

The location, temperature and velocity of injection of the hot air is important to satisfactory results and drying efficiency.

As is evident from FIGS. 1 and 2, we inject hot air downward through the multiple tubes 4 along the entire length of the mixer-dryer, although other methods of air addition will be obvious to one skilled in the art.

It is desirable to use temperatures as high as possible without resulting in scorched material. We have found temperatures of 500°F. to be damaging but no damage resulted when air was applied at 470°F. It will be obvious that the use of higher temperatures would reduce the required residence time in the mixer and would reduce any possible physical damage due to the action of the mixer itself. We have also found that higher air temperatures can be applied at the inlet end where moistures are above 50% than can be applied at the exhaust end where moistures are about 30%. For example, we have found that temperatures at the outlets of tubes 4 of 420°F. at the inlet end, 400° in the center section and 350°F. at the downstream end are satisfactory.

Air velocities must be selected within a range in which single cells and small agglomerates are removed from the system by entrainment but larger agglomerates are continually contacted by the mixing means until granulation is essentialy complete. In our equipment, velocities above 9000 feet per minute at point of injection had the same detrimental effect as excessive mixer speed — the product was suspended and did not mix properly. At the other extreme, velocities below 4000 feet per minute at point of injection resulted in unsatisfactory drying. We have found an air velocity of 6400 fpm in the tubes 4 to e satisfactory. This resulted in an upward air velocity of about 400 fpm at the top of the mixer dryer 5 and of about 160 fpm at the top of mixer hood 6.

Certain precautions must be taken in the handling of the cells and agglomerates which are entrained. If all material entrained from the mixing area is removed from the system, the end product is too moist, too coarse in particle size, and does not rehydrate quickly and completely after drying. As mentioned above, in the expanding area of hood 10, air velocities at the widest point reduce to about 160 fpm. This assures that large dense agglomerates — substantially larger than 40 mesh — will drop back into the mixer to undergo further granulation and not be removed from the system. Since the exhaust duct 7 is located toward the inlet end 12, this allows the large agglomerates which are dropped from entrainment in the expanded hood to be deposited into the mix nearer the inlet end where moistures are higher. Thus, after arriving at equilibrium conditions, the product at the inlet end of the mixer-dryer is about 65% – 75% in moisture; the product in the center is about 35–45% in moisture; and the product in the opposite end has a moisture content of about 25–30%. The product temperature throughout the mixer-dryer is about 115°–120°F. The rotational speed of paddle shafts 8 was about 100 rpm, and the level of product at rest in the mixer-dryer stabilized at a point about midway between shafts 8.

The mixing means utilized in the mixer-dryer gave satisfactory results. Other mixing devices would likewise be expected to give comparable results if the mixing action during the time the product is exposed to mixing is not damaging to the tender intact potato cells and yet the action is sufficient to constantly expose new high moisture surfaces and to break up agglomerates too large to be removed by entrainment in the heated air. For example, initial drying can be further accelerated by substituting closely set pin paddles in the first third of the mixer-dryer where moistures are high.

The time necessary to convert the hot mashed potato-emulsifier mix to a fine granulate ready for final drying is approximately 30–45 minutes. This is only a fraction of the time required in prior art potato granule processes. The brevity of the process inherently results not only in improved quality but in novel physical characteristis. Due to the rapid completion of drying, natural flavor is retained and the soluble amylose fraction of the starch is not appreciably retrograded to its insoluble form prior to drying. By retention of amylose in its soluble form, the product of the invention rapidly absorbs appreciably more cold water than commercial potato granules. In contrast, commercial potato granule processes require lengthy holding periods prior to drying for the purpose of accomplishing retrogradation or insolubilization of amylose since this toughens potato cells and aids in their separation in intact form. Such a retrograded product, although capable of forming excellent mashed potatoes when reconstituted in very hot water, does not absorb cold water appreciably, thereby limiting its applications.

The final stage of processing is final drying and dehydrating the granulated particles. The intact cells and small agglomerates entrained in the exhaust air duct 7 have a moisture content of about 16–20% and are separated by conventional means, such as, by a low velocity cyclone collector (not shown) which does not subject the particles to forces which would result in cell breakage during collection. At the collector discharge, the moisture content is about 12–18%, and the product is easily dried to the desired final moisture content of about 7–8% by conventional means, such as a hot air fluid bed dryer.

The dried product had a particle size substantially passing a standard 40 mesh screen and about 70% by weight passing through a standard 60 mesh screen. The small plus 40 mesh fraction comprises fibers and other undesirable particles and is discarded. The dried product is made into mashed potatoes by rehydrating in 5 parts by weight of salted water-milk mixture heated to boiling. The texture and appearance are excellent and the product is judged to have a more natural potato flavor than other commercial instant mashed potato products. This is attributed to such factors as lack of additives, short processing time and lower product temperature during processing.

Although exact parameters have been determined for our specially designed equipment, it will be obvious that adjustments would undoubtedly be required for other equipment designs.

Another embodiment of the invention utilizes a pre-drying step which is optional. The uniform hot mashed potato-monoglyceride mix with completely coated potato cells is riced onto a perforated screen drying surface and predried until about 75% of the moisture is removed by passing air heated to about 140°–150°F. over the mix for about five minutes. The predried mash is then fed into the mixer-dryer operated in the manner previously described. The predried mash granulates in about 4 minutes. The final product is good in quality but contains a higher percentage of larger agglomerates. When the predrying step is used to remove up to 56–68% of the moisture in the mash, the predried mash granulates in 6–12 minutes. The dry finished product is excellent in quality and comparable in granulation to the product produced by utilizing the preferred embodiment.

In recent years, processes for making instant mashed potato products, such as potato granules and potato flakes, have incorporated precooking and cooling steps prior to cooking. This sequence of steps results in a tougher cell that resists rupture during processing and makes a more mealy finished mash. However, these steps require additional equipment and greater water usage and result in appreciable solids loss. We have operated our inventive process both ways and have found no advantages to either. Thus our process, by eliminating the necessity of the precook-cool steps prior to cooking, is simplified and gives increased yields with less water usage.

Additional research has shown that the cold water absorption and other physical characteristics of the dehydrated granules of this invention can be varied by adjustment of feed rates and air temperatures. Of course, higher feed rates require hotter air to accomplish equivalent drying in a given piece of equipment. As feed rate increases, the residence time within the mixer-dryer decreases and the cold water absorption of the resulting end product increases. When the feed rate is decreased, the time in the undried state is increased, apparently allowing retrogradation of soluble amylose to take place, resulting in an end product with reduced cold water absorption—closer to that of conventional potato granules. Therefore, within limits, the inventive process allows one to produce end products having different physical characteristics which cannot be duplicated by potato granules produced by prior art processes and which give the product of the invention utility in specialized applications in which potato granules are not satisfactory.

In arriving at the preferred embodiment, objective tests were developed or utilized to advantage. For example, an estimation of cell rupture can be obtained by a variation of the Blue Value Test in which free starch is reacted with iodine and the depth of the blue color is measured objectively by light transmission. By varying only the percentage of monoglycerides, for example, and testing the product periodically for cell rupture during mixing, it was determined that mixes containing 0.75% glyceryl monostearate or higher by weight of solids showed no evidence of cell rupture (decrease of light transmission) even after 25 minutes of mixing. In contrast, mixes with 0.50% monostearate showed no rupture after 15 minutes, but some rupture resulted from prolonged mixing. When cooked mashed potatoes with no monoglyceride were used, appreciable rupture was detectable in less than 5 minutes and shortly thereafter an unmanageable mass resulted.

In a further aspect of our studies, an attempt was made to substitute oil for monoglyceride on the theory that lubrication alone might prevent cell rupture during the mixing-drying operation. It was found that the required granulation could not be obtained with oil alone, although oil in the concentration of 0.1 to 1.0% of the solids in combination with monoglyceride promoted granulation. This substantiates the theory that the starch complexing emulsifier complexes the soluble amylose in the hot mash, thereby reducing the cohesiveness sufficiently so that the tender intact potato cells when coated with additional emulsifier are lubricated sufficiently so that they do not rupture during the mixing-drying steps. Although it has been long appreciated that these emulsifiers complex soluble amylose, it has not been known prior to applicants' invention that these starch complexing emulsifiers could be incorporated into mashed potatoes in a way which would allow separation and drying of intact cells to produce a new product with the appearance of conventional potato granules but having new and useful characteristics completely different from potato granules of the prior art. The greatly shortened processing time at low product temperatures from starting mashed potatoes to finished dried product (approximately 30–45 minutes) apparently obviates the necessity to add preservatives and antioxidants during processing as is required in commercial prior art instant mashed potato processes both to protect the product during processing and to impart stability during storage. This is a distinct advance in the art, since such additives are restricted in many countries and are becoming less acceptable everywhere.

Comparative analysis of applicants' product with typical commercial potato granules and potato flakes are shown in the following table:

| Procedure | Applicants' Product | Commercial Potato Granules | Commercial Potato Flakes |
|---|---|---|---|
| Soluble Starch | | | |
| Hot Extraction (1) | 50.5 | 52.0 | 4.0 |
| Cold Extraction (2) | 100.0 | 100.0 | 56.5 |
| $SO_2$ (ppm) | 0–80.0 | 380.0 | 375.5 |
| BHT (antioxidant—ppm) (3) | 0.0 | 7.0 | 14.2 |
| Recipe Rehydration Ratio (4) | 5.5:1 | 4.8:1 | 6.0:1 |
| Cold Water Absorption (5) | 4.85:1 | 3.2:1 | 5.75:1 |
| Amylograph Units | | | |
| Cold (6) | 2300 | 545 | 3300 |
| Hot (7) | 540 | 650 | 450 |
| Flavor Evaluation | Fresh Potato | Bland | Starchy |
| Texture Evaluation | Very Good | Very Good | Slightly |

-continued

| Procedure | Applicants' Product | Commercial Potato Granules | Commercial Potato Flakes |
|---|---|---|---|
| | | | Sticky |

(1) % transmission, 185°F. extract, 0.1% solution with iodine added.
(2) % transmission, 70°F. extract, 0.1% solution with iodine added.
(3) Butylated hydroxytoluene
(4) Parts of boiling liquid per part of product required to make mashed potatoes.
(5) Parts of water at 70°F. absorbed by 1 part by weight product.
(6) 100 parts product, 400 parts water, 10 minutes at 0–4°C.
(7) 5 parts product, 450 parts water, 45 minutes starting at 25°C. and ending at 92.5°C.

The above data show that the product of the invention is comparable to potato granules in soluble starch and far less than potato flakes.

The sulfur dioxide value of the product is much lower than flakes and granules which are comparable.

The product is far above potato granules and slightly below potato flakes in the ability to absorb hot and cold liquid.

The product has a cold amylograph viscosity far higher than potato granules and slightly lower than potato flakes. The hot amylograph viscosity is higher than potato flakes and half way between flakes and potato granules.

The product was judged to have superior flavor and texture when compared to potato flakes and a superior flavor to conventional potato granules.

Unless otherwise stated herein all percentages are by weight.

What is claimed is:

1. A direct process for the production of dehydrated granular potato product having a high cold water adsorption essentially consistng of the following steps:
   a. preparing potatoes for cooking;
   b. cooking the prepared potatoes;
   c. mixing uniformly with the cooked potatoes, a starch complexing emulsifier in the concentration of about 0.30–2.0% by weight of the total solid matter, to coat the surface of the cells of the cooked potatoes with the emulsifier and directly
   d. granulating the mixture of step (c) by
      1. mixing the mixture using sufficient mixing action to expose continually new surfaces for drying without rupturing the coated cells and by
      2. reducing the moisture of the mixture to about 25 to 30% by injecting heated air below about 500°F on the surfaces of the mixture so that intact potato cells and agglomerates of intact cells are separated from the mixture, performing steps (c) and (d) before any significant conditioning of said mixture can take place;
   e. airlifting the granulated cells and agglomerates by entrainment in the heated air,
   f. separating the airlifted materials from entrainment in the heated air; and
   g. drying the separated materials to a final moisture content of about 7–8% whereby the conversion of amylose to its insoluble retrograded form is prevented.

2. The process of claim 1 in which the starch complexing emulsifier is glyceryl monostearate.

3. The process of claim 1 in which the starch complexing emulsifier is selected from a group consisting of monoglycerides of fatty acids, sodium stearyl fumarate, calcium stearoyl-2-lactylate, sodium stearoyl-2-lactylate, and propylene glycol monoesters.

4. The process of claim 1 wherein the granulating step is performed in a mixer-dryer and the heated air is injected directly onto the surfaces of the mixture at a temperature below 500°F., the temperature of the injected air being reduced as the point of injection is farther removed from the inlet of the mixer-dryer so that the highest temperature air is applied to the highest moisture mix, and the lowest temperature air is applied to the lowest moisture mix.

5. The process of claim 1 wherein steps d(1) and d(2) are performed simultaneously.

6. The process of claim 1 wherein the temperature of the injected air is below 500°F. and the velocity of the injected air is above 4000 fpm.

7. The process of claim 6 wherein the temperature range is 350°–470°F. and the velocity at the point of injection onto the surfaces is about 6400 fpm.

8. The process of claim 1 wherein the moisture content of the mixture at which point the intact potato cells and agglomerates are separated is 25–30% by weight of the mixture.

9. The process of claim 8 in which the product maintained in entrainment is in the moisture range of about 16–20%.

10. The process of claim 9 in which the separated cells and smaller agglomerates are in the moisture range of 12–18%.

11. A direct process for the production of dehydrated granular potato product having a high cold water adsorption essentially consisting of the following steps:
   a. preparing potatoes for cooking;
   b. cooking the prepared potatoes;
   c. mixing uniformly with the cooked potatoes, a starch complexing emulsifier in the concentration of about 0.30–2.0% by weight of the total solid matter, to coat the surface of the cells of the cooked potatoes with the emulsifier and directly;
   d. granulating the mixture of step (c) by
      1. mixing the mixture using sufficient mixing action to expose continually new surfaces for drying without rupturing the coated cells and by
      2. reducing the moisture of the mixture to about 25 to 30% by injecting heated air below about 500°F on the surfaces of the mixture so that intact potato cells and agglomerates of intact cells are separated from the mixture, performing steps (c) and (d) before any significant conditioning of said mixture can take place;
   e. airlifting the granulated cells and agglomerates by entrainment in the heated air;
   f. returning the larger of the agglomerates to the mixture from entrainment in the air by expanding the cross sectional area of flow above the mixture sufficiently to reduce the velocity of the heated air sufficiently to deposit the larger agglomerates back into the mixture while still maintaining the granulated cells and the smaller of the agglomerates in entrainment in the heated air;

g. separating the airlifted materials from entrainment in the heated air; and h. drying the separated materials to a final moisture content of about 7–8% whereby conversion of the amylose to its insoluble retrograded form is prevented.

12. The process of claim 11 wherein the reduced velocity is approximately 160 fpm, the dried separated material has a particle size substantially passing a standard 40 mesh screen and the fraction failing to pass is discarded.

13. The process of claim 11 wherein about 70% by weight of the isolated cells and agglomerates have a particle size which substantially passes a standard 60 mesh screen and the small plus 40 mesh fraction comprises mostly fibers and other undesirable particles.

14. The process of claim 1 in which the dried separated material is dried in a fluid bed dryer to a moisture content of about 7–8%.

15. The process of claim 1 in which processing steps (d) through (f) are completed in a total time of about 30–45 minutes.

16. The process of claim 1 in which the direct process is made continuous by adding continuously to step (d) mashed potato-starch complexing emulsifier mixture from step (c) in an amount roughly equal in solid matter to the potato solids separated continuously from the entraining air in step (f).

17. The process of claim 1 in which the mixing step (c) takes place at a temperature above the melting point of said starch complexing emulsifier.

18. The process of claim 1 in which said starch complexing emulsifier is colloidally dispersed in water prior to said mixing step.

19. The process of claim 1 in which said preparing step further comprises lye peeling and dipping the lye peeled potatoes into a sulfur dioxide-containing solution prior to cooking.

20. The process of claim 19 in whih said solution conains about 0.5% sulfur dioxide.

21. The process of claim 1 further comprising the steps of conventional precooking and cooling prior to cooking.

22. The process of claim 1 in which the cooked prepared potatoes are mixed with water to produce a slurry of about 18% solids followed by removal of defective portions to produce a defect-free slurry prior to the mixing step (c).

23. The process of claim 1 in which the cooked potato-starch complexing emulsifier admixture as produced in step (c) is predried by heated air to remove up to about 75% of the moisture content of the mixture prior to introduction into the granulating step as recited in step (d).

24. The process of claim 1 in which the method of cooking is selected from a group consisting of steam, hot water and hot oil.

25. The process of claim 3 in which oil in the concentration of 0.1 to 1.0% by weight of the solids present is incorporated in the mixing step (c).

26. A direct process for the production of dehydrated intact cooked potato cells and small agglomerates thereof essentially consisting of the following steps:

a. preparing potatoes by washing; trimming;

b. cooking the prepared potatoes to completion;

c. admixing starch complexing emulsifier uniformly with said cooked potatoes at a temperature above the melting point of said emulsifier and in a concentration so that said emulsifier comprises about 1.0% of the total solid matter present, thereby coating the cells of said cooked potato with said emulsifier;

d. mixing said coated potato cells in a mixer-dryer using sufficient mixing action to expose continuously new large drying surface areas without rupturing the cells while simultaneously e. injecting high velocity heated air below about 500°F onto the surface areas of the mixture to lower the moisture content of the coated cells;

f. granulating the coated cells when the moisture content has been reduced to the range of about 25–30%, thereby separating single cells and agglomerates, performing steps (c), (d), (e) and (f) before any significant conditioning of said mixture can take place;

g. entraining peel particles along with the separated single cells and agglomerates from the mixer-dryer in heated air;

h. reducing the velocity of the air carrying entrained material to a point at which the larger of the entrained agglomerates above the size that will pass a 40 mesh screen fall from entrainment back into the mixer-dryer while the peel particles, along with the single cells and the smaller of the entrained agglomerates remain entrained and are removed from the system;

i. separating the solid matter from the entraining air;

j. drying the solid matter to a moisture content of about 7–8% whereby the conversion of amylose to its insoluble retrograded form is prevented; and k. separating the peel particles from the dried solid matter, thereby isolating the dried intact cells and small agglomerates.

27. Potato product formed by the process of claim 1.

28. Potato product produced by the process of claim 26.

29. Potato product produced by the process of claim 11.

* * * * *

UNITED STATES PATENT AND TRADEMARK OFFICE
CERTIFICATE OF CORRECTION

PATENT NO. : 3,968,260
DATED : July 6, 1976
INVENTOR(S) : Mounir A. Shatila and Robert M. Terrell It is certified that error appears in the above-identified patent and that said Letters Patent are hereby corrected as shown below:

Col. 6, line 7 delete "comfiguration" and substitute --configuration--.

Col. 7, line 38, delete "e" and substitute --be--.

Col. 8, lines 15-16, delete "characteristis" and substitute --characteristics--.

Col. 10 - Move table up so as to have last line read as follows:

--Texture Evaluation    Very Good    Very Good    Slightly Sticky--

Col. 11 - In the table, delete the word "sticky"; delete underscoring of "sticky".

Col. 11, in procedure (7), delete "5" and substitute --75--.

Col. 13, line 16 (Claim 13) delete "11" and substitute --12--.

Col. 13, line 44 (Claim 20) delete "whih" and substitute --which--.

Signed and Sealed this

Nineteenth Day of October 1976

[SEAL]

Attest:

RUTH C. MASON
*Attesting Officer*

C. MARSHALL DANN
*Commissioner of Patents and Trademarks*